United States Patent
Reynolds

[15] 3,683,862
[45] Aug. 15, 1972

[54] POULTRY SUCTION LOADING APPARATUS AND METHOD

[72] Inventor: Frank N. Reynolds, Auburn, Maine
[73] Assignee: Poultry-Vac, Inc., Lewiston, Maine
[22] Filed: Jan. 18, 1971
[21] Appl. No.: 107,334

[52] U.S. Cl. ..................................... 119/82, 43/6.5
[51] Int. Cl. ........................................ A01k 29/00
[58] Field of Search ................................... 119/82

[56] References Cited

UNITED STATES PATENTS 3,568,643  3/1971  Wessinger ................... 119/82
3,103,915  9/1963  Crain et al. ................... 119/82

Primary Examiner—Aldrich F. Medbery
Attorney—Auslander and Thomas

[57] ABSTRACT

A method and apparatus for sucking loading poultry into transportable compartments, protecting the poultry in loading and during transportation.

40 Claims, 9 Drawing Figures

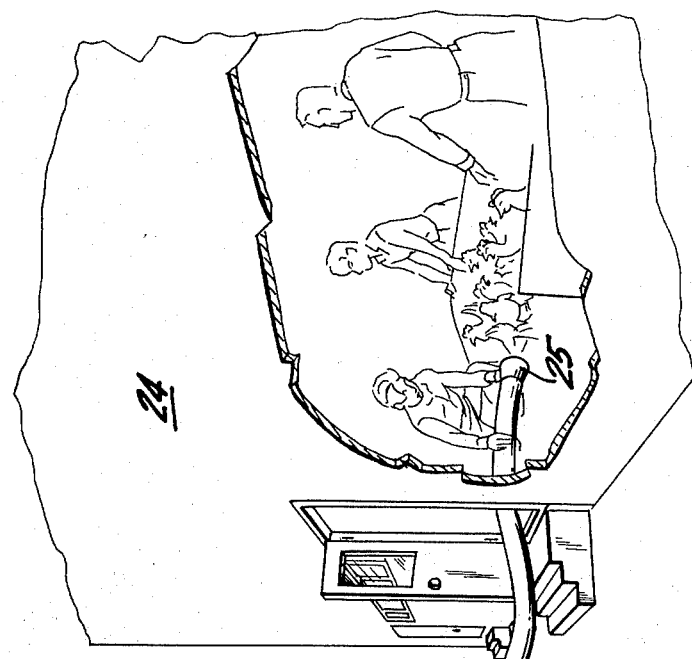
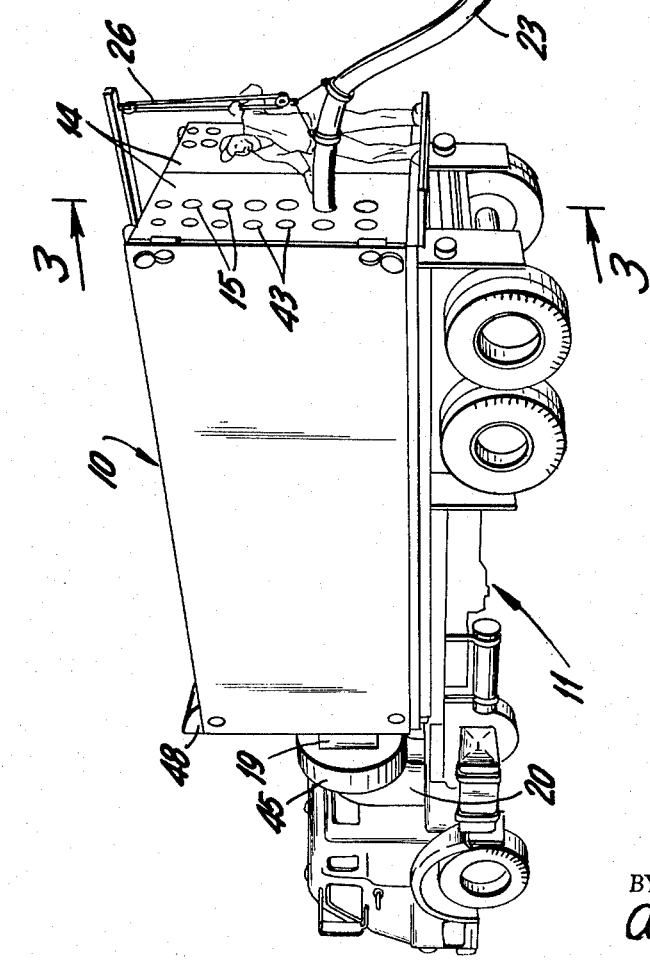

INVENTOR.
FRANK N. REYNOLDS
BY Auslander & Thomas
ATTORNEYS

POULTRY SUCTION LOADING APPARATUS AND METHOD

In today's poultry farming, mechanization has cut costs of production. This has been brought about by, among other things, segregating the various functions of poultry raising into specialized segments such as maintaining laying flocks, hatching eggs and having a grower raise birds, until they are ready for market.

Each such operation is performed to maximize efficiency and permit greatest automation of each operation.

Once birds have reached optimum or selected size, they are crated and shipped off to the processing plant to be prepared for sale to the public.

Until now, though, the process of crating birds for delivery has been rather crude and done by hand, in most instances.

The process of crating birds has been fraught with many problems. Birds in the past have often been cornered in a bird house by a catching crew, then physically grabbed and stuffed into standard poultry crates. The crates are then stacked and shipped via trucks to the appointed destination.

The process of crating for conveying is expensive in terms of manual labor and further in terms of bruising and other damage to the birds incurred in the course of their capture and crating.

Some money-saving expedients have been employed to save labor and expense in the bird crating process. Such techniques as the use of special loader grapples on a crane to load a plurality of crates on a truck has proven of some value.

Some attempts have even been made to use a vacuum means to catch the birds, then hand load birds into conventional crates. The later method still required a good deal of bird handling with its concommitant danger of bruising the bird and the extra labor of placing the birds in crates.

The crate which has been used in the past has usually been 1 foot high by 2 feet deep and 3 feet long, each holding about 12 to 16 birds. The upper and lower portions of the crate were spaced apart by spaced dowels or other spacers allowing free ventilation for the birds in the crate.

The disadvantages of the old system are many. Perhaps the foremost of these disadvantages is the decreasing labor available for this type of work. This problem has reached the acute stage. This method of procurement is highly conducive to bruising and losses of dead and damaged birds due to rough handling. Smothering occurs during the catching of the birds by piling them up in corners and during transit due to the small amount of air movement around the densely stacked crates. The fact that five or six birds at a time are forced through the opening of the crate when loading and are forcibly pulled from these crates when they are hung on the shackles in the plant, causes further damage.

According to the present invention, a method and apparatus is provided whereby a vacuum is applied to a tube or hose, the tube being large enough to allow a bird to freely pass through it. The bird is then sucked through the hose into a container which is usually substantially air tight except for its special openings. The container is filled with a selected number of birds picked up by the tube. The container is then provided with a flow of circulating air regulated to keep a normal body temperature of the birds in the container while they are being transported to their destination.

An apparatus for effectuating bird loading requires at least a stationary engine powering a high vacuum blower and possibly air circulation in the compartment. The suction side of the blower is connected to a plenum or air chamber. This air chamber, standing vertically, forms a common front to a number of long rectangular compartments arranged in a horizontal position and stacked two, side by side. The compartments' sizes and number are dependent on amount of load desired. These compartments are enclosed at the rear by two large hinged doors which are gasketed to form an air tight fitting to the end of each individual compartment. Into these doors are fitted round ports which correspond to the center of each compartment. The purpose of these ports is for the connection of a suitable size tubular pipe or pick up hose to transport the birds into the compartments.

Although such novel feature or features believed to be characteristic of the invention are pointed out in the claims, the invention and the manner in which it may be carried out may be further understood by reference to the description following and the accompanying drawings.

FIG. 1 is a view showing one method of performing the process of the present invention.

Referring now to the figures in greater detail, where like reference numbers denote like parts in the various figures:

Figure 2:
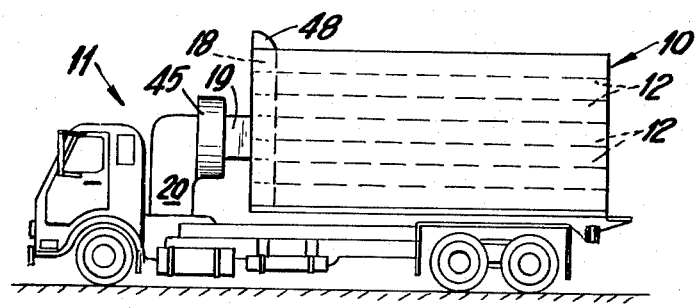
FIG. 2 is a side elevation of a complete apparatus of the present invention on a truck.

In FIG. 1 a master container 10 is shown affixed to a truck 11. The container 10 comprises a plurality of compartments 12 separated by a partition 13. Each compartment 12 is preferably closeable by a gasketed master gate 14 having a port 15 for each compartment 12. The end 16, away from the port 15 of the compartment 12, is closed off by the air permeable member 17, such as a screen so that there can be no free passage of a bird outside the compartment 12 or into the plenum chamber 18.

Figure 7:
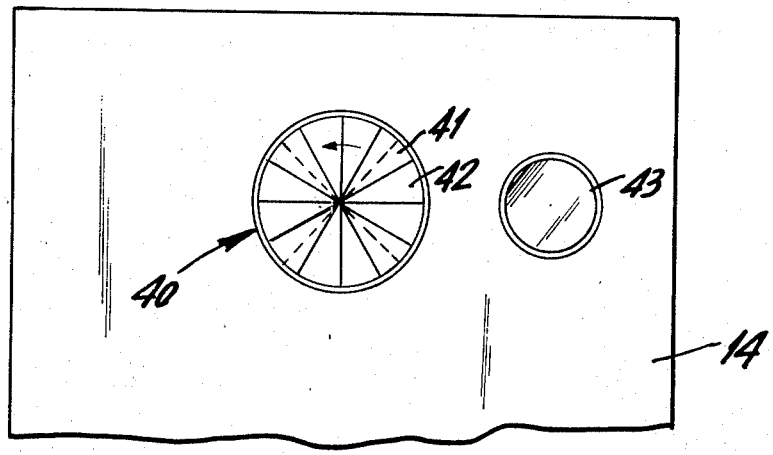
FIG. 7 is a detail of a chamber loading port-vent and viewing port.

In FIG. 7 the port 15 is shown closed with a plug 40 which includes adjustable dampers 41, 42 to regulate the flow of air in the compartment 12 when the hose 23 is not inserted in the port 15.

A viewing port 43 is preferably adjacent the port 15 so that an operator may observe the loading of the birds into the compartments 12.

Spaced apart from the compartment ends 16 is a plenum chamber 18 with a duct 19 which may lead to a stationary engine 20, capable of drawing air through the compartment 12.

Figure 5:
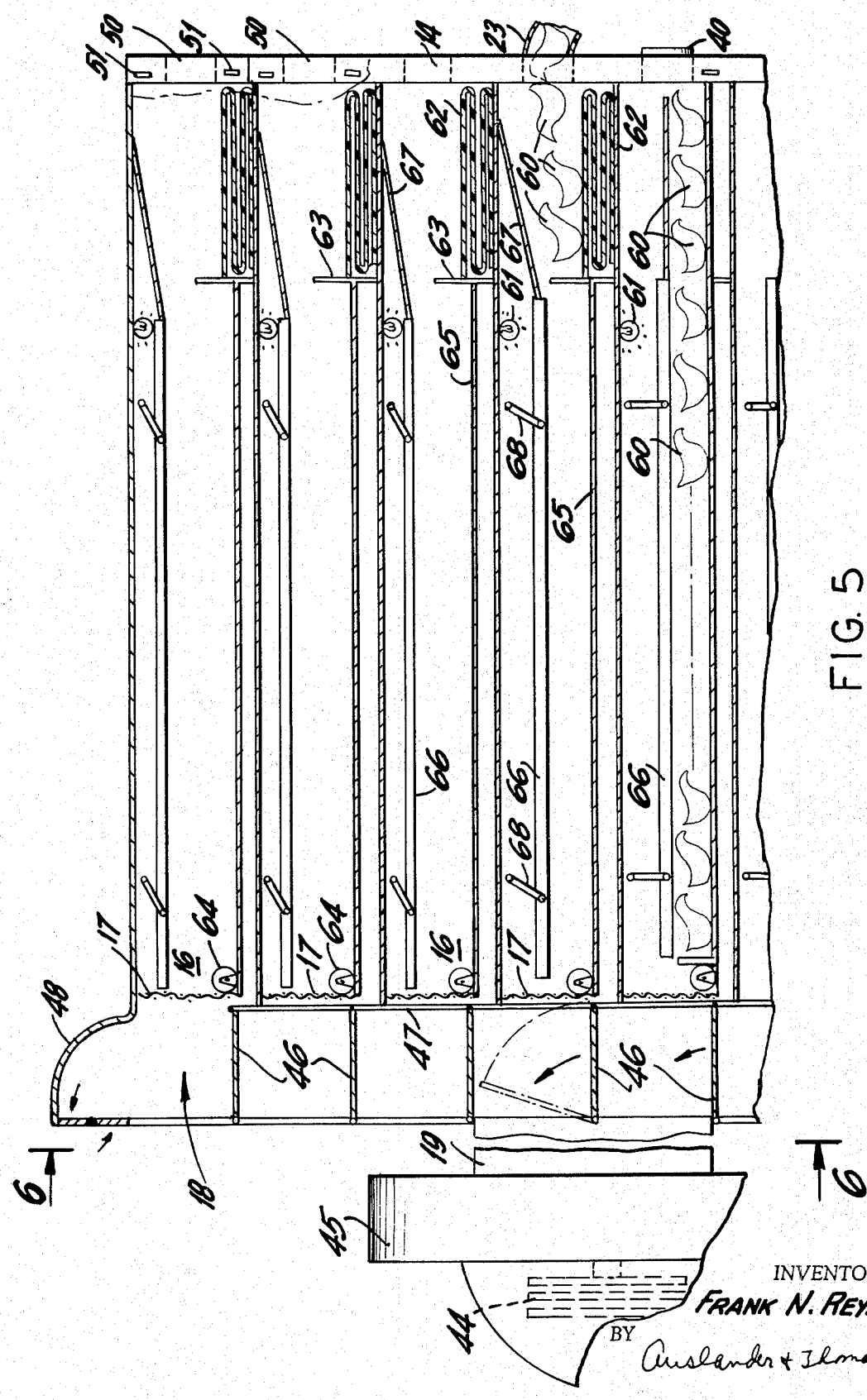
FIG. 5 is a variant enlarged detail of FIG. 3.

In FIG. 5 a pump drive is seen geared to a suction pump 45 with a duct 19 leading to the plenum chamber 18.

Figure 6:
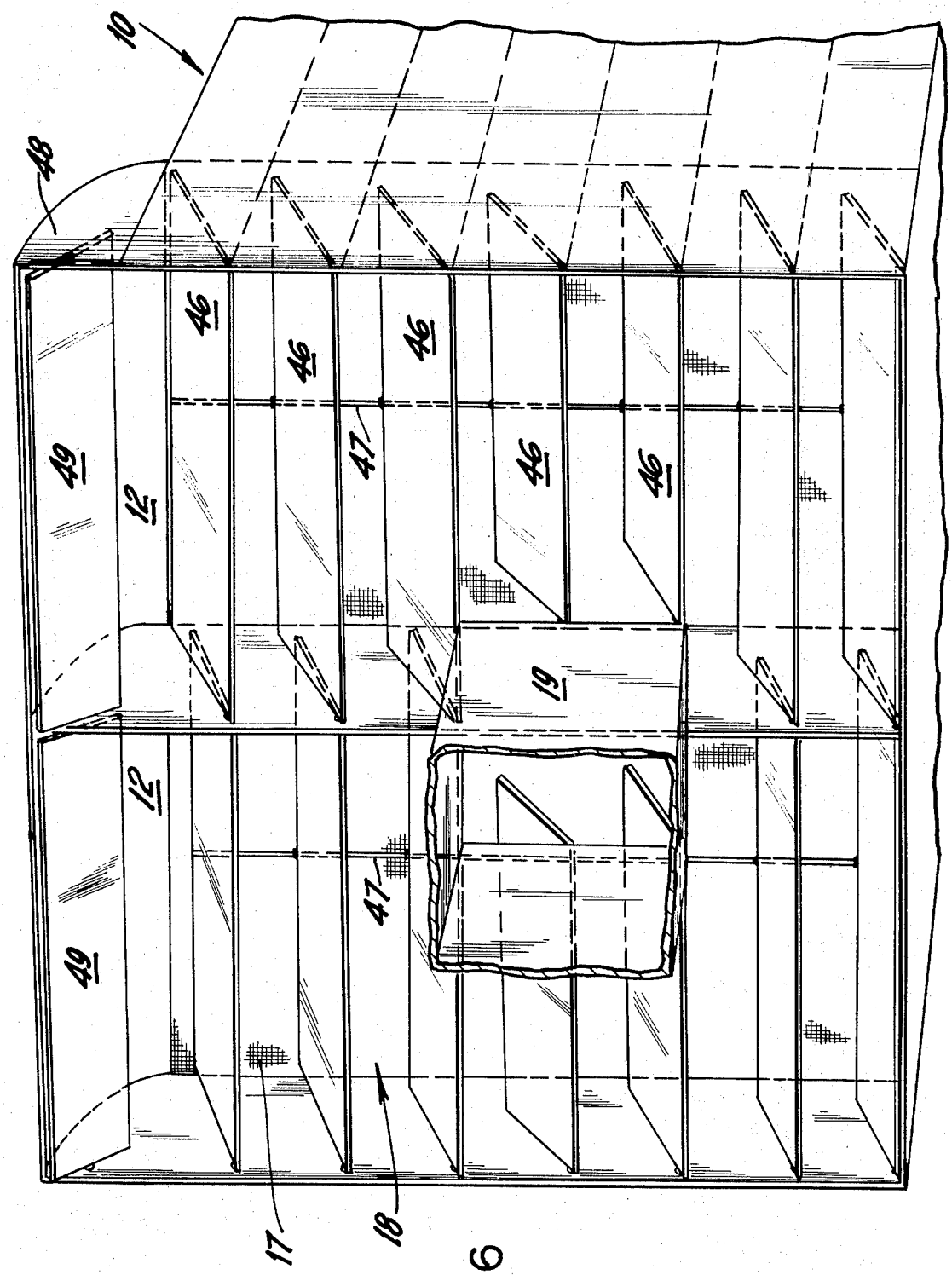
FIG. 6 is an elevation of FIG. 5 at lines 6—6.

In FIG. 6 the compartment doors can be seen, their open position joined by closure rods 47. The scoop 48 protrudes above the compartment area of the plenum so that it can ventilate the compartment 12 when desired or be closed off by its damper 49 with the doors 46 so that a suction can be caused in the compartment 12 when desired.

The master gate 14 is closeable to cover the intake end 21 of each compartment.

The master gate 14 area is preferably gasketed (not shown) to prevent air leakage when the gate 14 is closed and the stationary engine 20 is sucking air through ports 15 or dampers 41.

Figure 3:
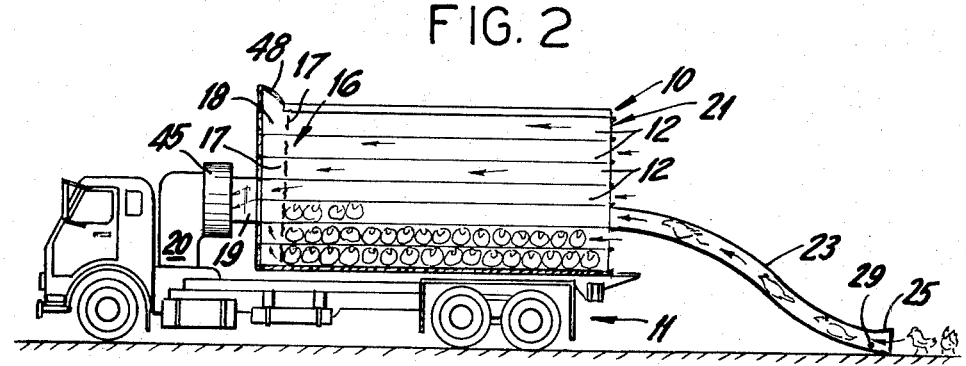
FIG. 3 is a section of FIG. 2 along lines 3—3 showing the intake of birds.
Figure 4:
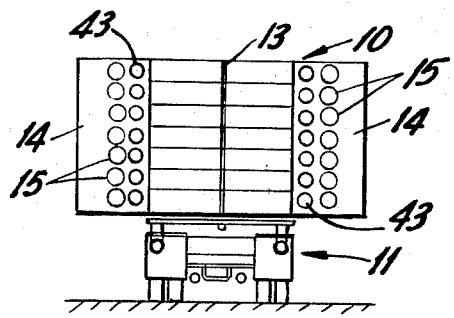
FIG. 4 is a rear elevation of FIG. 1 with open gates.

When the master gate 14 is closed, as shown in FIGS. 1 and 3, a hose 23 may be introduced into a selected port 15, the other end of which extends into a poultry house 24. The catching crew may then load the birds by easing them to the flared end 25 of the hose 23 where they are sucked into the selected compartment 12.

When compartment 12 has a sufficient density of birds, the hose may be moved to another empty compartment 12, either manually or by use of the adjustable hoist 26 until the entire master container 10 has been loaded.

The port plugs 40 may be removed one at a time to open one compartment 12 at a time.

A stationary engine 20 is preferably thermostat controlled to keep a constant selected temperature inside the compartment 12 by regulating its air flow and/or the dampers 41 may be under thermostat control.

Once a compartment 12 has birds inside, it is important to maintain a regular flow of air so that the body heat of the birds does not raise the internal temperature of the compartment 12 to a point where the health of the bird or birds is endangered.

To this end, a stationary engine 20 may be kept in constant movement, drawing air in through the ports 15 and dampers 41 and out the engine's 20 exhaust, once it has passed through the compartment 12.

Figure 9:
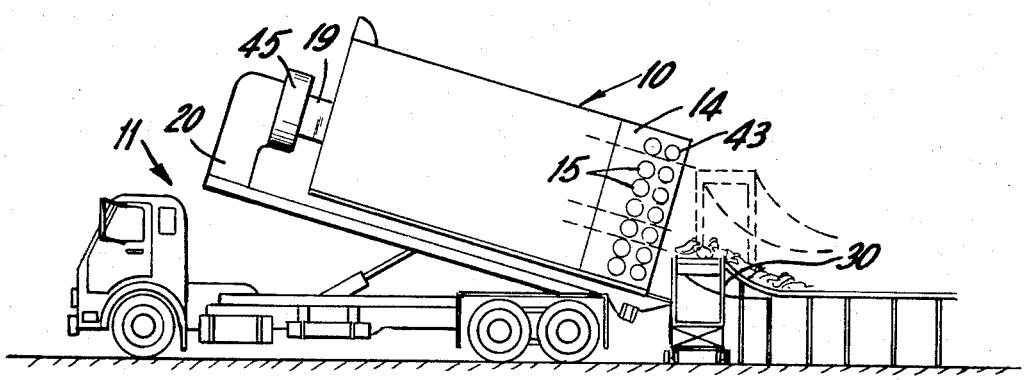
FIG. 9 is one means of discharging a cargo of birds of the present invention.

A loaded truck 11 with a master container 10 may be brought to a processing plant and emptied as shown in FIG. 9 by opening the master gate 14 and dumping the birds onto a conveyor 30.

A counter 29 may be provided within the hose 23 so that the density of birds in any one compartment 12 can be controlled by count, to protect the well being of the occupant birds in a compartment. Each compartment 12 may act as a separate unit for the loading and conveyance of poultry, though it is expedient to have a plurality of compartments 12 that can be loaded successively, one at a time.

The method of loading is performed by connecting a hose 23 to the port 15 of an enclosed compartment and extending it to the location of the birds to be loaded, usually in a poultry house 24, then applying a vacuum to the compartment 12 to suck the birds through the hose and into the compartment 12. Once a selected number of birds have filled the compartment 12, air is circulated in the compartment 12 to maintain a normal temperature for the birds in the compartment 12. The method may be repeated where there is a plurality of compartments 12 by removing the hose 23 from first selected compartment 12 and connecting the hose 23 to the next selected compartment 12 to load that compartment 12 with the selected number of birds.

A preferred mode and apparatus for the loading of poultry is shown in FIG. 5. The door 14 is preferably a single unit though in the detail doors 50 are shown with individual hinges 51 as optional way of opening the compartments 12 individually. In FIG. 5 the hose 23 is shown inserted in a port 15 with birds 60 being sucked into the compartment 12. An operator may watch the loading through the viewing port 43. The compartment 12 is illuminated by a light 61 preferably blue so that the normally color blind birds 60 are not affected by the light.

The birds enter the compartment 12 and rest on a folded liner 62 which is overfolded or rolled so that it may stretch the length of the compartment 12. One end of the liner 62 abuts a baffle 63. When the birds have filled the entry portion of the compartment 12 the motor 64 is actuated to pull the liner strap 65 allowing more birds 60 to be filled into the compartment 12 as can be seen in the lower compartment 12 in which the liner 62 extends the length of compartment 12.

Below the roof of the compartment 12 is a crowd screen 66. The crowd screen 66 may have a deflector 67 which is raised when birds 60 are being loaded.

As shown in FIG. 5 the crowd screen 66 may have pivots 68 to adjust their height to the bird 60 size being loaded.

Figure 8:
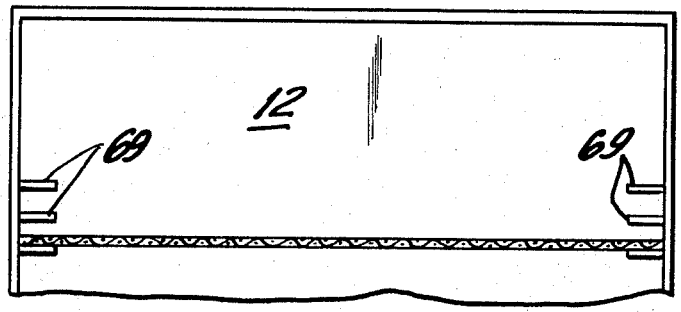
FIG. 8 is a front elevation of another embodiment of a chamber of the present invention.

In FIG. 8 an alternate adjustment of the crowd screen 66 is based upon supports 69 at preset levels.

The crowd screen 66 provides a ventilator passage above the birds 60 to prevent suffocation and allow circulation of air either to warm the birds 60 or to let off their body heat as the case may be.

In transit the birds may receive air through natural intake through the doors 46 when they are open. The doors 46 may be closed and air intake may be through the scoop 48 with its damper 49 open.

When loading birds the doors 46 may be simultaneously closed joined by the rods 47 and the scoop damper 49 closed. All must be properly gasketed (not shown). With the doors 46 and scoop damper 49 shut, ventilation may also be had through the duct 19.

In the preferred method of unloading, upon locating at the plant hanging lines, the near doors are opened and the liners are pulled by mechanical means or by hand toward the men who hang the birds.

The master container 10 may be a separate unit removable from the truck and engine 20 such as a pick-a-back container for use on a rail car also. The stationary engine 20 is joined by duct 19 to the plenum chamber 18 into which all of the compartments 12 have an open free end 16. A thermostat (not shown) controls the constant air flow in the master container 10 when loaded with birds to maintain a proper internal temperature to protect the birds against overheating from their own concentration and body warmth.

Each compartment 12, in turn, may be loaded and when full the hose 23 may be manually placed in another port 15 for loading or may be assisted for placement in a port 15 by use of an adjustable hoist 26, which also helps to keep the hose 23 in position while loading. The port plugs 40 are replaced and the dampers adjusted for proper ventilation.

The terms and expressions which are employed are used as terms of description; it is recognized, though, that various modifications are possible.

Having thus described certain forms of the invention in some detail, what is claimed is:

1. A method for loading and carrying a plurality of poultry comprising the step of applying a sucking force to a mobile compartment having a generally air tight body, extending a hose into a first opening into one portion of such compartment to the presence of a bird, causing a vacuum through another opening removed from said first opening in said compartment, sucking said bird into said compartment through said hose, and repeating the step of sucking birds into different portions of said compartment until a selected number of birds have been sucked into said compartment.

2. The method of claim 1 including the step of removing a plug to an opening in said compartment and introducing said hose into said opening.

3. The method of claim 2 including the step of closing said opening in said compartment with an air permeable member, after loading said birds.

4. The method of claim 3 wherein said air permeable member is adjustable and is adjusted to the needs of the birds in said compartment.

5. The method of claim 3 including the step of maintaining a continuous flow of air in said compartment.

6. The method of claim 4 including the step of maintaining a circulation and temperature in said compartment conducive to the health of the birds in said compartment.

7. The method of claim 1 wherein a plurality of compartments are successively loaded.

8. An apparatus for loading and carrying a plurality of birds comprising at least one mobile compartment having a generally air tight body adapted to hold a plurality of birds; said compartment having a first opening large enough to admit the passage therethrough of selected birds, said opening further having means to receive a hose, large enough to allow passage therethrough of selected birds, and vacuum means connected to another opening in said compartment to suck birds through said hose into said first opening of said compartment.

9. The apparatus of claim 8 also including a closed end permeable to the passage of air.

10. The apparatus of claim 8 including a closure for said hose opening.

11. The apparatus of claim 10 wherein said closure includes adjustable damping means.

12. The apparatus of claim 8 having air circulating means.

13. The apparatus of claim 12 wherein said air circulation means is thermostatically controlled to maintain a selected temperature in said compartment conducive to the health of birds in said compartment.

14. The apparatus of claim 8 wherein said vacuum means is a stationary engine.

15. The apparatus of claim 8 including a plurality of juxtaposed compartments of like construction.

16. The apparatus of claim 15 wherein each compartment includes a closed end permeable to the passage of air.

17. The apparatus of claim 15 wherein each said compartment opening includes a closure having an opening large enough to admit passage of selected birds.

18. The apparatus of claim 15 wherein each compartment closure opening is adapted to receive a hose large enough to admit the passage of selected poultry through said duct.

19. The apparatus of claim 15 wherein each compartment has air circulation means.

20. The apparatus of claim 19 wherein said air circulation means is thermostatically controlled to maintain the selected temperature in said compartments conducive to the health of the birds in said compartments.

21. The apparatus of claim 15 wherein said vacuum means is a stationary engine.

22. The apparatus of claim 15 wherein said compartments are contained in a master container.

23. The apparatus of claim 22 wherein said master container includes vacuum inducing means.

24. The apparatus of claim 23 wherein said vacuum inducing means is a stationary engine.

25. The apparatus of claim 24 wherein said stationary engine and master container are unitary and mountable on a truck.

26. The apparatus of claim 15 wherein said hose receiving portions are mounted on a gate, said gate adapted to close said compartments.

27. The apparatus of claim 16 wherein said closed ends permeable to the passage of air open into a plenum chamber.

28. The apparatus of claim 27 including a plurality of substantially air tight doors optionally openable to give access to at least a selected compartment.

29. The apparatus of claim 27 including a substantially air tight damper optionally openable to vent said plenum chamber.

30. The apparatus of claim 8 including an air permeable crowding screen substantially along the upper portion of said compartment spaced away from the top of said compartment.

31. The apparatus of claim 30 wherein said crowding screen is optionally adjustable as to height.

32. The apparatus of claim 31 wherein said screen has selected supports at selected levels in said compartment.

33. The apparatus of claim 8 including a liner, said liner adapted to be extended along the length of said compartment.

34. The apparatus of claim 33 including a baffle adjacent an end of the liner.

35. The apparatus of claim 34 including means to draw said liner and baffle toward the closed permeable end of said compartment.

36. The apparatus of claim 10 including a viewing port in said closure.

37. The apparatus of claim 36 including a light inside said compartment.

38. The apparatus of claim 8 including a single door for said compartment.

39. The apparatus of claim 15 including a single door for a plurality of said juxtaposed compartment.

40. The apparatus of claim 8 including a means for removing said birds from said compartment by withdrawing a liner on the base of said compartment.

* * * * *